United States Patent
Rankin

(10) Patent No.: US 7,209,576 B2
(45) Date of Patent: Apr. 24, 2007

(54) METHODS, APPARATUS AND COMPUTER PROGRAM PRODUCTS FOR PROCESSING IMAGES OF A GOLF BALL

(75) Inventor: David Benjamin Rankin, Winston-Salem, NC (US)

(73) Assignee: Accu-Sport International, Inc., Winston-Salem, NC (US)

( * ) Notice: Subject to any disclaimer, the term of this patent is extended or adjusted under 35 U.S.C. 154(b) by 811 days.

(21) Appl. No.: 10/360,196

(22) Filed: Feb. 7, 2003

(65) Prior Publication Data
US 2004/0030527 A1 Feb. 12, 2004

Related U.S. Application Data

(60) Provisional application No. 60/355,474, filed on Feb. 7, 2002.

(51) Int. Cl.
*G06K 9/00* (2006.01)

(52) U.S. Cl. .................... 382/107; 348/155; 73/488; 356/27

(58) Field of Classification Search ................ 382/100, 382/103, 106, 107; 73/488; 348/154, 155
See application file for complete search history.

(56) References Cited

U.S. PATENT DOCUMENTS

| | | | |
|---|---|---|---|
| 4,063,259 A | 12/1977 | Lynch et al. | |
| 4,158,853 A | 6/1979 | Sullivan et al. | |
| 4,375,887 A | 3/1983 | Lynch et al. | |
| 4,542,906 A | 9/1985 | Takase et al. | |
| 5,413,345 A * | 5/1995 | Nauck | 473/156 |
| 5,471,383 A | 11/1995 | Gobush et al. | |
| 5,472,205 A | 12/1995 | Bouton | |
| 5,489,099 A * | 2/1996 | Rankin et al. | 473/199 |
| 5,501,463 A | 3/1996 | Gobush et al. | |
| 5,575,719 A | 11/1996 | Gobush et al. | |
| 5,614,823 A | 3/1997 | Katayama et al. | |
| 5,651,741 A | 7/1997 | Masutani et al. | |
| 5,718,639 A | 2/1998 | Bouton | |
| 5,803,823 A | 9/1998 | Gobush et al. | |
| 6,031,933 A | 2/2000 | Kumagai | |
| 6,042,483 A | 3/2000 | Katayama | |

(Continued)

FOREIGN PATENT DOCUMENTS

EP 0 340 936 A1 11/1989

(Continued)

OTHER PUBLICATIONS

Davies, E.R., *Machine Vision, Theory, Algorithms, Practicalities*, 1990, Academic Press, pp. 77-99.

(Continued)

*Primary Examiner*—Vikkram Bali
*Assistant Examiner*—Anand Bhatnagar
(74) *Attorney, Agent, or Firm*—Alston & Bird LLP

(57) ABSTRACT

Methods, apparatus and computer program products are provided for capturing and thereafter analyzing the images of a golf ball in a manner that permits various parameters associated with a golf shot, including the backspin and sidespin of the golf ball, to be reliably determined. Further, the method, apparatus and computer program product may be configured to separately calibrate each image that is captured in a timely manner.

25 Claims, 8 Drawing Sheets

U.S. PATENT DOCUMENTS

| | | |
|---|---|---|
| 6,226,416 B1 * | 5/2001 | Ohshima et al. ............ 382/289 |
| 6,241,622 B1 | 6/2001 | Gobush et al. |
| 6,286,364 B1 | 9/2001 | Aoyama et al. |
| 6,390,934 B1 | 5/2002 | Winfield et al. |
| 6,431,990 B1 | 8/2002 | Manwaring |
| 6,458,035 B1 | 10/2002 | Katayama |
| 6,488,591 B1 | 12/2002 | Gobush et al. |
| 6,500,073 B1 | 12/2002 | Gobush et al. |
| 6,898,971 B2 * | 5/2005 | Dilz, Jr. ....................... 73/488 |
| 2002/0085213 A1 | 7/2002 | Yamamoto et al. |
| 2002/0098897 A1 | 7/2002 | Manwaring |
| 2002/0098898 A1 | 7/2002 | Manwaring |
| 2002/0155896 A1 * | 10/2002 | Gobush et al. ............. 473/197 |
| 2004/0032970 A1 * | 2/2004 | Kiraly ....................... 382/103 |

FOREIGN PATENT DOCUMENTS

| | | |
|---|---|---|
| WO | WO 97/45177 A1 | 12/1997 |
| WO | WO 99/57683 A1 | 11/1999 |
| WO | WO 00/44450 A1 | 8/2000 |

OTHER PUBLICATIONS

Jain, A.K., *Fundamentals of Digital Image Processing*, 1989, Prentice Hall, pp. 407-414.

Hundelshausen, F. V., *An Omnidirectional Vision for Soccer Robots*, Apr. 2001, pp. 1-61.

Form PCT/ISA/206 Annex—Communication Relating to the Results of the Partial International Search for PCT/US03/03741.

* cited by examiner

METHODS, APPARATUS AND COMPUTER PROGRAM PRODUCTS FOR PROCESSING IMAGES OF A GOLF BALL

CROSS REFERENCE TO RELATED APPLICATION(S)

The present application claims priority from a provisional application bearing Application No. 60/355,474 filed Feb. 7, 2002 and entitled "Launch Monitor and Associated Methods for Processing Images of a Golf Ball", the contents of which are incorporated herein in their entirety.

FIELD OF THE INVENTION

The present invention relates generally to methods, apparatus and computer program products for analyzing golf shots and, more particularly, to a launch monitor and associated image processing methods for determining various parameters associated with the launch of a golf ball including, for example, one or more components of the spin of a golf ball.

BACKGROUND OF THE INVENTION

Tracking of a golf shot and/or the measurement of a number of parameters associated with a golf shot are performed for a variety of purposes. For example, a golfer may wish to track the golf shots taken at a driving range and/or determine various parameters associated with the golf shots in order to gauge his/her performance. In addition, the manufacturers of golf clubs and golf balls oftentimes desire to track golf shots and/or to measure a variety of parameters associated with the golf shots in order to determine the performance of a golf club or golf ball.

Launch monitors are available to monitor various parameters associated with a golf shot. These parameters include the launch angle, the backspin of the golf ball and, in some instances, the sidespin of the golf ball. With respect to a golf ball sitting upon a tee, backspin is measured about a horizontal axis extending through the center of the golf ball transverse to the downrange direction in which the golf ball is driven. Conversely, sidespin is the angular rotation of the ball about a vertical axis extending through the center of the golf ball. Based upon these parameters, the anticipated path of travel of the golf ball can be projected quite accurately, thereby permitting a golfer or the manufacturer of a golf club or golf ball to determine the relative merit of the golf shot.

In order to determine the backspin and the sidespin of a golf ball, at least two images of the golf ball must be captured and analyzed. These images must generally be captured in quick succession so that the golf ball will have had an opportunity to rotate only a fraction of a revolution, as a result of either the backspin or the sidespin. Although the sidespin is generally less than few hundred revolutions per minute or less, the backspin may be in the neighborhood of 5000 revolutions per minute. For shots with a wedge, however, the backspin may be 12000 revolutions per minute or greater. As such, the images must be captured with only an extremely small time lapse therebetween. Additionally, the images must be captured prior to the exit of the golf ball from the field of view of the camera and generally with at least some spacing or separation between the images of the golf ball. For example, conventional launch monitors may require that the images that are captured be separated by about 1 to 5 milliseconds. Moreover, the images generally require relatively high resolution in order to permit the backspin and sidespin to be determined with the desired precision. As a result of the relatively high resolution and the precise timing of the images, the cameras that are generally utilized for monitoring the launch of the golf ball are quite expensive and may cost $15,000 or more.

Even with expensive cameras, conventional launch monitors cannot detect the backspin and sidespin of a standard golf ball. Instead, the golf ball must be marked in a particular manner in order to facilitate the detection of the backspin and sidespin of the golf ball. For example, the golf balls may be marked with a circumferential stripe as well as an additional marking. This additional marking may include tick marks on the circumferential stripe on opposite sides of the golf ball or a second circumferential stripe positioned at an angle, such as 90°, relative to the other circumferential stripe. By analyzing the relative positions of the circumferential stripe(s) at the times at which the two images are captured, the backspin and sidespin of the golf ball may be determined. Alternatively, the golf balls may be marked with a predefined pattern of reflective or fluorescent spots which are visible in the resulting images. By analyzing the relative positions of these spots at the times at which the images are captured, the backspin and sidespin of the golf ball can also be determined. As will be apparent, the requirement that specially marked golf balls be utilized in measure the backspin and sidespin of a golf shot further complicate conventional tracking techniques.

Moreover, conventional launch monitors generally require substantial alignment and calibration routines in order to properly position the launch monitor with respect to a golf ball. As such, it generally takes a significant period of time and, at least in some instances, a skilled technician to align and calibrate the launch monitor prior to use. Accurate operation of these conventional launch monitors is their dependence upon the golf ball being positioned the same distance away from the camera during each golf shot; a requirement that is not always met.

As such, it would be desirable to develop an improved technique for monitoring the launch of a golf ball and for determining various parameters associated with the golf shot including the backspin and the sidespin in a manner that is less expensive than conventional techniques. In addition, it would be desirable to develop a launch monitor that could be readily positioned and calibrated with respect to a golf ball, preferably in an automated fashion, while still permitting some variation in the spacing between the golf ball and the camera without adversely affecting the accuracy with which the launch monitor determines various parameters associated with a golf shot.

SUMMARY OF THE INVENTION

Methods, apparatus and computer program products are provided according to the present invention for capturing and thereafter analyzing the images of a golf ball in a manner that permits various parameters associated with a golf shot, including the backspin and sidespin of the golf ball, to be determined in a reliable and efficient manner. Further, the method, apparatus and computer program product of one aspect of the present invention separately calibrate each image that is captured in a timely manner so as to avoid the undesirable delays associated with setup and calibration of conventional launch monitors.

According to one aspect of the present invention, a method, apparatus and computer program product are provided for determining at least one component of the spin of a golf ball. According to this aspect of the invention, first and second images of the golf ball are captured at different times during the flight of the golf ball, such as with a single camera. The golf ball has a mark and, in some embodiments, only a single mark thereon that is visible in each image. For each image of the golf ball, the pixels that are representative of the golf ball are distinguished from the other pixels representative of the unmarked portion of the golf ball and at least some pixels that are representative of the mark on the golf ball are mapped to corresponding locations within a three dimensional coordinate system. For example, the latitude and longitude values for at least some pixels that are representative of the mark on a golf ball may be determined. Typically, the method, apparatus and computer program product do not map all of the pixels that are representative of the mark on the golf ball to corresponding locations within the three dimensional coordinate system but, instead, map pixels that are both representative of the mark on the golf ball and spaced apart from one another to corresponding locations within the three dimensional coordinate system.

Thereafter, a plurality of candidate planes are generated for each image of the golf ball. Each candidate plane extends through the respective locations of at least two pixels that have been mapped to the three dimensional coordinate system. Preferably, the candidate planes also extend through the center of the golf ball. A respective reference plane is then determined for each image of the golf ball based upon the plurality of candidate planes for the respective image of the golf ball. While the respective reference plane may be determined in various manners, the method, apparatus and computer program product of one embodiment determine the reference plane for respective images of the golf ball based upon an average of the plurality of candidate planes for the respective image of the golf ball. The reference planes may be represented, for example, by respective vectors extending through the center of the golf ball.

At least one component of the spin of the golf ball is then determined based upon the respective reference planes for the first and second images of the golf ball. For example, at least one of backspin, sidespin and rifle spin may be determined based upon a cross product of the vectors representing the respective reference planes for the first and second images of the golf ball. Additionally, the total revolutions per minute of the golf ball may be determined based upon a dot product of the vectors representing the respective reference planes for the first and second images of the golf ball. As such, the method, apparatus and computer program product of this aspect of the present invention provide an efficient and accurate technique for determining the spin of a golf ball.

Upon receiving an image that includes a golf ball, a method according to another aspect of the present invention identifies the pixels that are representative of the golf ball. In this regard, a distribution of pixel values is constructed from a smallest pixel value to a largest pixel value. Commonly, this distribution is based upon all of the pixels within the image. Thereafter, a predefined number of pixels are identified that are closest in value to one of the smallest pixel value and the largest pixel value. The predefined number of pixels that are identified are considered to be representative of the golf ball, while the other pixels are considered to represent the background. While the predefined number of pixels may be defined in various manners, the predefined number of pixels may be based upon the number of pixels representative of the golf ball. As such, the method of this aspect of the present invention accurately identifies a golf ball within an image as required for subsequent processing of the image.

According to another aspect of the present invention, a method of detecting an edge of a golf ball within an image is provided. According to this method, an approximation of the edge of the golf ball is determined. Thereafter, respective pixel values of pixels extending in a radial direction are evaluated both interior and exterior of the approximate edge of the golf ball. Based on this evaluation, an edge location is determined based upon a predefined relationship between the pixel values of adjacent pixels. As opposed to evaluating the pixel values of individual pixels, the method of one embodiment evaluates average pixel values of groups of pixels that are adjacent to one another in the radial direction. This evaluation can then be repeated for different groups of pixels in the radial direction until the average pixel values of two adjacent groups of pixels satisfy the predefined relationship, thereby defining the respective edge location. Based upon the plurality of edge locations determined in different radial directions about at least a portion of the circumference of the golf ball, the edge of the golf ball may be determined. For example, a plurality of candidate edges may be constructed with each edge represented by a circle including at least three edge locations. Thereafter, the edge of the golf ball may be selected based upon a plurality of candidate edges. As such, the method of this aspect of the present invention permits the edge of the golf ball to be precisely defined so as to support further analysis of the image of the golf ball.

According to yet another aspect of the present invention, a method, apparatus and computer program product for calibrating an image of a golf ball are provided. According to this aspect of the present invention, an image of the golf ball is received. The diameter of the golf ball and the number of pixels within the image that represent the golf ball are then determined. Based upon the diameter of the golf ball and the number of pixels that represent the golf ball, a scale of the image is determined. The scale of the image may define, for example, the physical dimensions of that portion of the image represented by each pixel. Thereafter, at least one parameter associated with the flight of the golf ball is determined based upon the scale of the image.

In this regard, first and second images of the golf ball may be captured at different times during the flight of the golf ball. As such, at least one parameter may be determined that is based upon both a distance between the first and second images of the golf ball and the scale of the image. As such, the distance between the first and second images of the golf ball as expressed in terms of pixels may be converted to corresponding physical dimensions prior to computation of the parameter(s). By separately calibrating each image of the golf ball, the method, apparatus and computer program product of this aspect of the present invention provide accurate results without requiring extensive setup and calibration procedures to be conducted prior to operation.

BRIEF DESCRIPTION OF THE DRAWINGS

Figure 1:
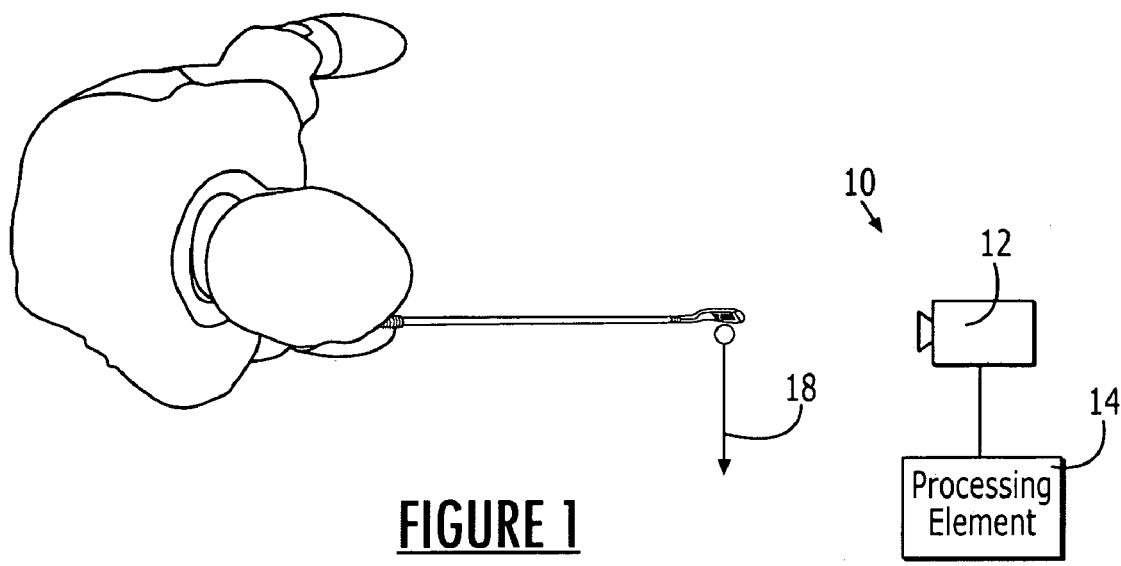
Figure 2:
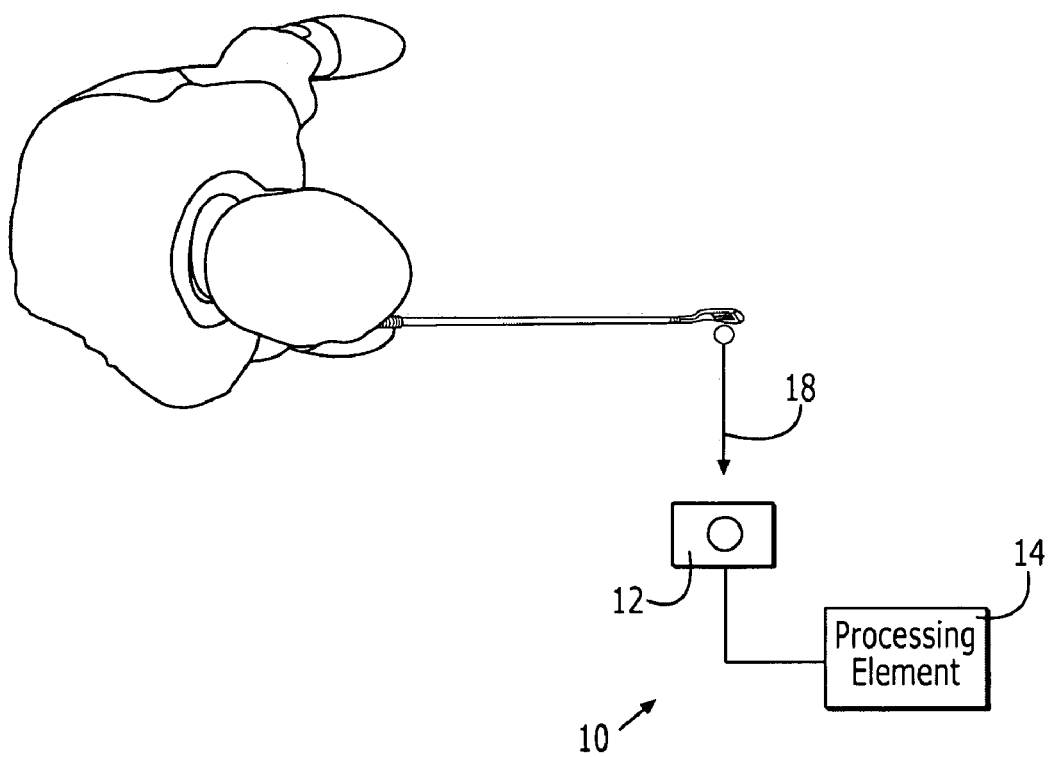
Figure 3:
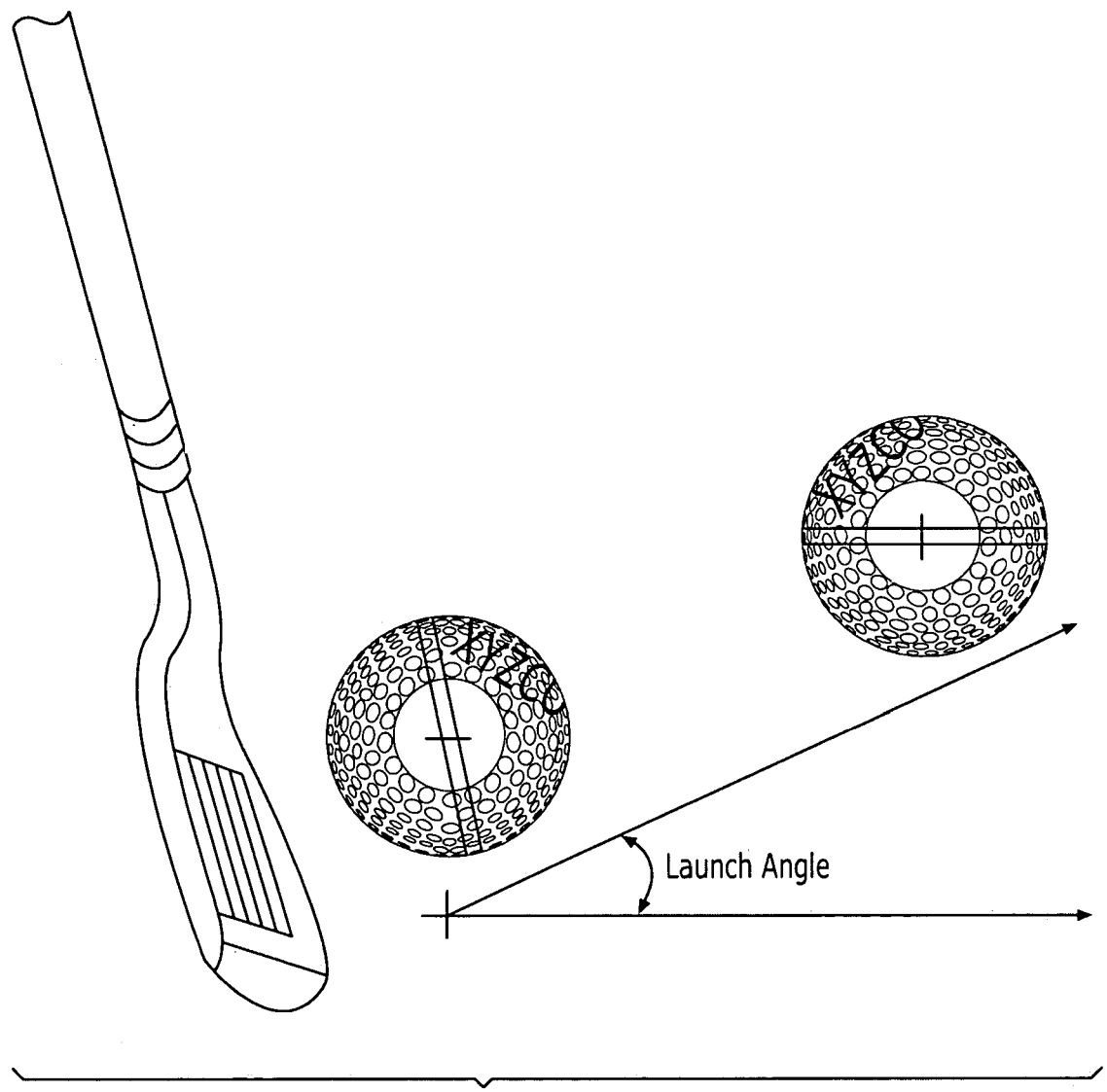
Figure 4:
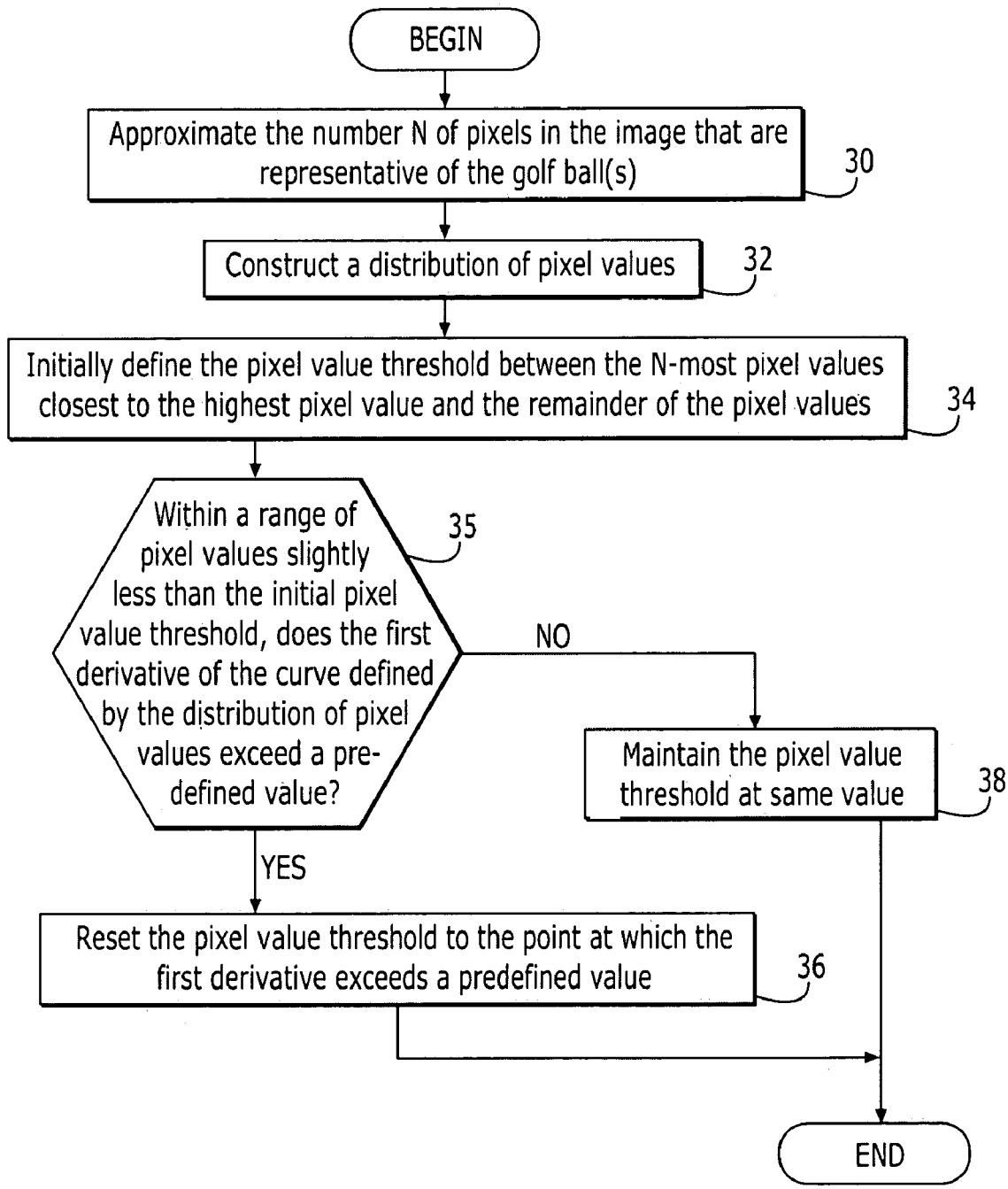
Figure 5:
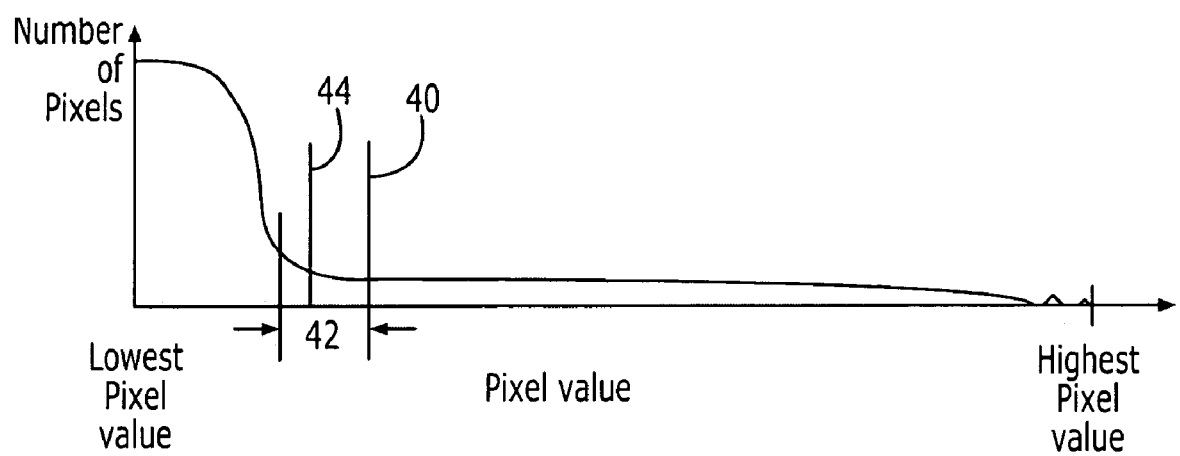
Figure 6:
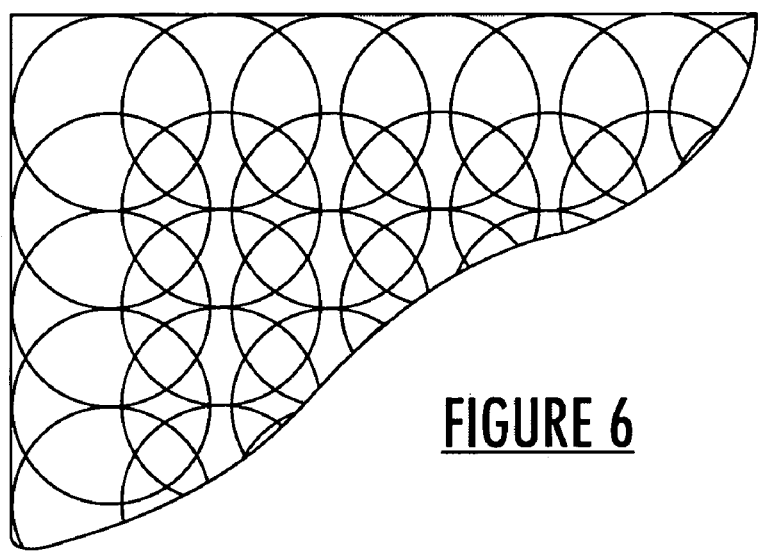
Figure 7:
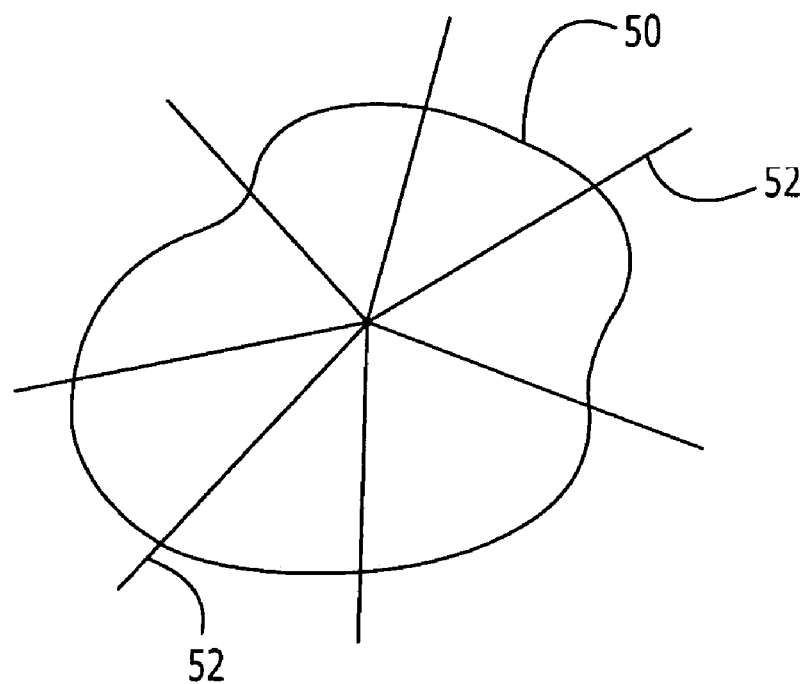
Figure 8:
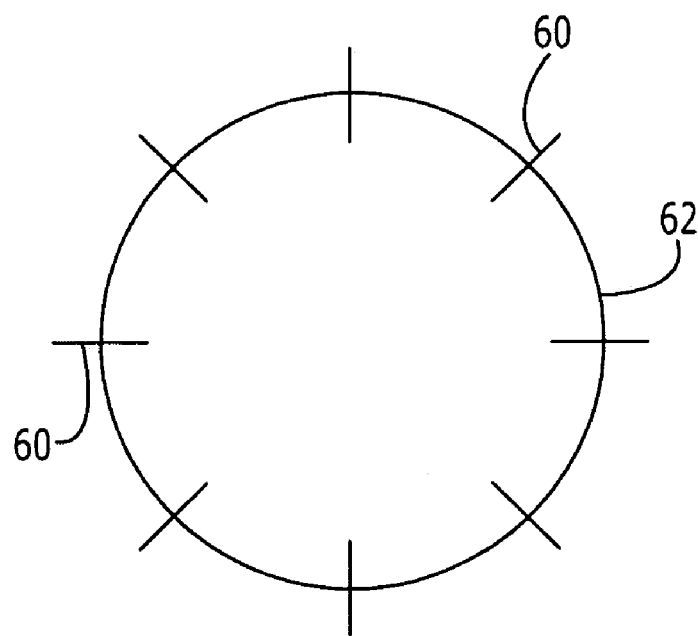
Figure 9:
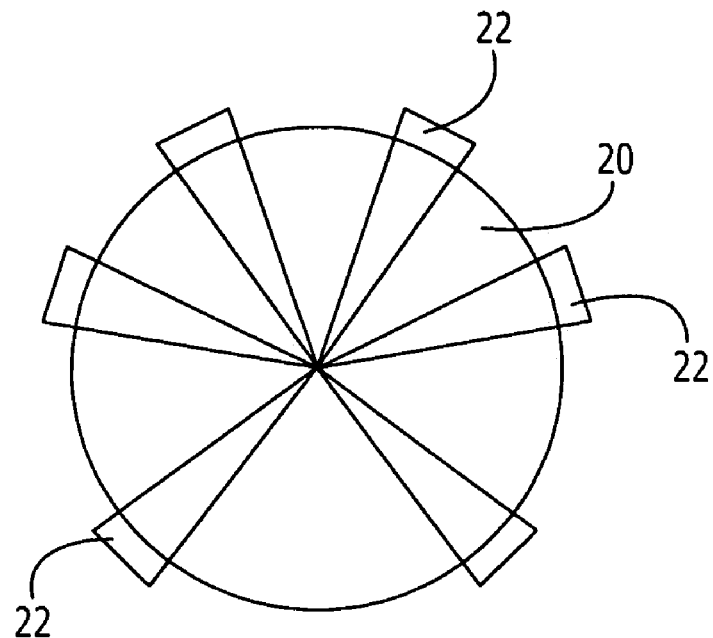
Figure 10:
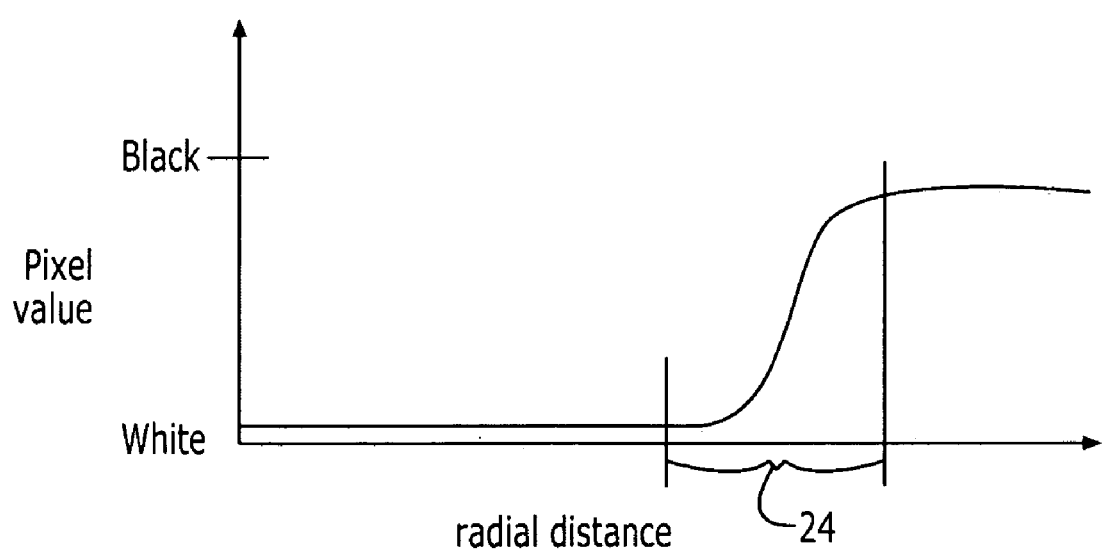
Figure 11:
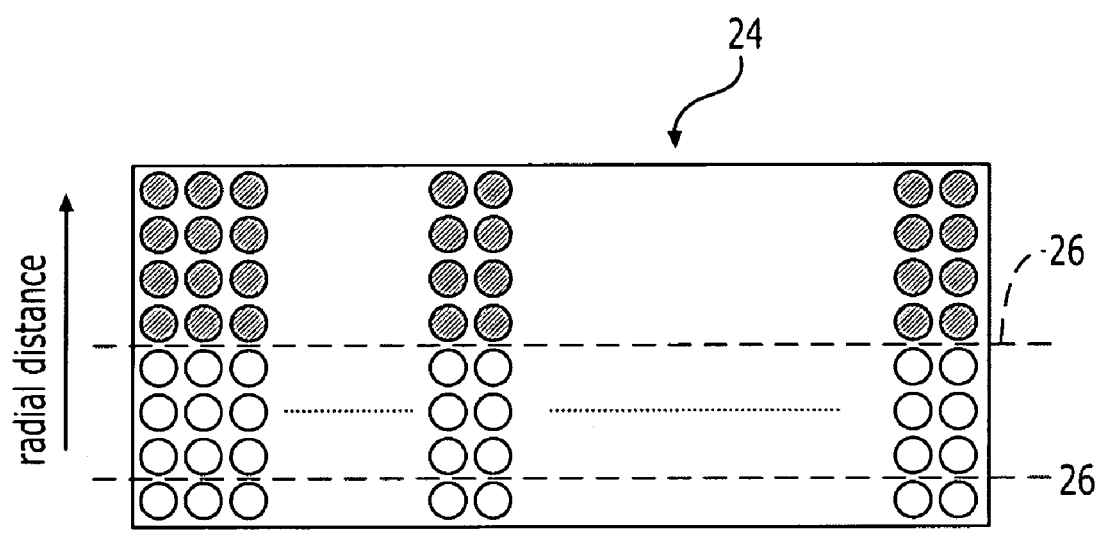
Figure 12:
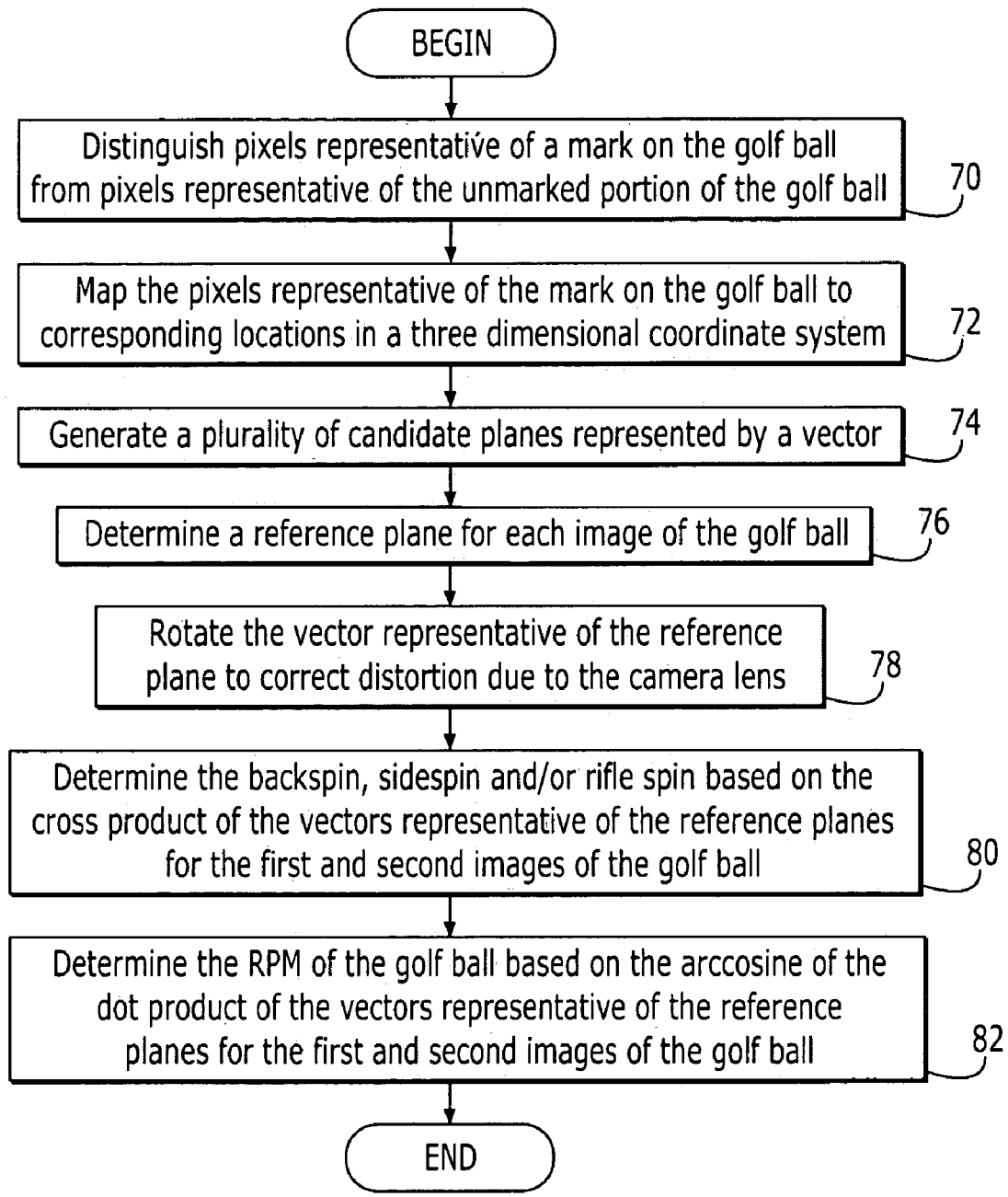

Having thus described the invention in general terms, reference will now be made to the accompanying drawings, which are not necessarily drawn to scale, and wherein:

FIG. 1 is a schematic representation of a launch monitor positioned proximate a tee box for capturing images of the golf ball according to one embodiment of the present invention;

FIG. 2 is a plan view of a launch monitor according to another embodiment of the present invention which includes an upwardly facing camera disposed in advance of the tee box along the anticipated path of travel of the golf ball;

FIG. 3 is a pair of images of a golf ball captured at different times during the flight of the golf ball which illustrate the radial displacement of a reference point between the first and second images of the golf ball and which are analyzed according to a method of one embodiment of the present invention to determine the sidespin, backspin and/or rifle spin of the golf ball;

FIG. 4 is a flowchart depicting the operations performed to identify a pixel value threshold according to one embodiment of the present invention;

FIG. 5 is a distribution of pixel values that is constructed and analyzed in accordance with one embodiment of the present invention;

FIG. 6 is a fragmentary view illustrating the plurality of circular regions of the image that are analyzed to identify blobs that may include an image of the golf ball;

FIG. 7 is a representation of a blob that may be representative of an image of a golf ball illustrating the initial analysis of the edge locations that is performed while centering the blob with respect to the image of the golf ball according to one embodiment of the present invention;

FIG. 8 is a representation of the radial segments that are analyzed about the circumference of the image of the golf ball in order to refine the edge of the golf ball according to one embodiment of the present invention;

FIG. 9 is a graphical representation of one technique for dividing the section of the image which depicts the golf ball into segments according to one embodiment of the present invention;

FIG. 10 is a graph of pixel values as a function of radial distance from the center of a golf ball which is used to estimate the location of the edge of a golf ball according to one embodiment of the present invention, FIG. 11 is a group of pixels that include the edge of the ball within a respective segment of the image that is analyzed according to one embodiment of the present invention; and FIG. 12 is a flow chart illustrating the operations performed to determine various parameters associated with a golf shot according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As described below in conjunction with FIGS. 1 and 2, a launch monitor 10 and associated image processing methods of the present invention are particularly well suited for analyzing the golf shots taken at a practice or driving range. However, the launch monitor and associated image processing methods of the present invention can analyze golf shots taken from other locations without departing from the spirit and scope of the present invention.

According to one aspect of the present invention, a launch monitor 10 is provided for measuring a number of parameters that define a golf shot. These parameters include, for example, ball launch speed, ball launch angle (up/down), ball launch angle (right/left), ball launch backspin and ball launch sidespin. As known to those skilled in the art, a launch monitor can also measure additional parameters associated with a golf shot if so desired, as described in U.S. patent application Ser. No. 09/305,396 by David B. Rankin, et al. entitled Golf Club Fitting System and Method, the contents of which are incorporated herein by reference in their entirety. The launch monitor measures the parameters associated with a golf shot within a window of time that may begin shortly before the golfclub strikes the ball and ends shortly after the golf ball is launched. Typically, however, the launch monitor measures the various parameters associated with a golf shot within the first 5 milliseconds following the golf club striking the golf ball.

A launch monitor 10 generally includes a triggering mechanism for triggering a camera (described below) to capture one or more images of the golf ball. In this regard, the launch monitor can utilize any conventional triggering mechanism. As known to those skilled in the art, conventional triggering mechanisms typically detect movement of a golf club past a particular point or contact of the golf club with the golf ball. In any instance, the triggering mechanism alerts the camera or, more typically, a controller which, in turn, directs the camera to capture multiple images of the golf ball at different predetermined times coincident with or following the receipt of the alert from the triggering mechanism.

The launch monitor 10 also includes at least one camera 12 and associated processing circuitry 14 for analyzing the images captured by the camera in the manner described below. The launch monitor can include any of a variety of different cameras. For example, the launch monitor may include a Panasonic® camera from the MF series or comparable cameras provided by Sony and Kodak. Regardless of the type of camera, the image capture hardware of the camera typically includes an image sensor, such as an array of charge coupled devices (CCDs), for initially capturing the images, a lighting source, such as a flash or strobe, and a memory device for storing the images initially captured by the image sensor. The image capture hardware may also include a controller, or be responsive to control signals issued by the associated processing circuitry, for directing transfer of the images initially captured by the image sensor to the memory device and for actuating the lighting source, as well as the shutter if necessary, to capture the images at predetermined times following the alert provided by the triggering mechanism.

The launch monitor 10 and, in particular, the camera 12 preferably captures at least two images of the golf ball at slightly different times following the launch of the golf ball. The time lapse between the images captured by the camera might vary depending upon the application. However, in applications in which the backspin and/or sidespin of the golf ball is to be determined, the images must be captured in quick enough succession to eliminate any confusion relating to angular amount that that the golf ball has rotated. For example, the images should be captured in quick enough succession that there will be no confusion as to whether the golf ball has rotated 45°, 225°, 405°, etc. In this regard, the images are generally captured in quick enough succession that the golf ball has not rotated more rotated than 360°, and typically not much more than 180°, due to either the backspin or the sidespin. If the launch monitor captures images in such a manner that the golf ball could conceivably have rotated more than 180° between the times at which the images were captured, the launch monitor and, more particularly, the associated processing circuitry 14 preferably includes logic for determining the actual amount of rotation of the golf ball. For example, the logic implemented by the controller may indicate that small angles of rotation, such as 5°, are actually reflective of a rotation greater than 180°, such as 185°. While the sidespin may have values in the neighborhood of 100 revolutions per minute, the backspin is generally much larger with values typically ranging up to 5,000 revolutions per minute and, in instances in which the golf ball is struck with a wedge, with values that approach or exceed 12,000 revolutions per minute. As such, the launch monitor of one embodiment captures a first image shortly after the golf ball separates from the face of the golf club and a second image about 1 to 5 milliseconds and, more typically, about 1.5 milliseconds later such that two non-overlapping images of the golf ball can be obtained from which the angular rotation of the golf ball due to either backspin or sidespin can be determined without ambiguity.

The launch monitor 10 may include two or more cameras 12, each of which is adapted to capture a single image of the golf ball at a respective instant in time. Alternatively and advantageously, the launch monitor may include a single camera that obtains two or more images of the golf ball at different respective times following its launch, thereby operating in a double or multiple frame mode. As a result of the relatively short time lapse between the images, the camera may be designed or actuated to operate in a double or multiple strobe mode such that the shutter remains open while the flash is strobed two or more times. Alternatively, the camera may be designed or actuated to operate in a double or multiple shutter mode whereby two exposures are taken in the same frame by physically opening the shutter two or more times in rapid succession. As such, the resulting image captured by the camera includes multiple images of the ball, each of which reflects the position and orientation of the golf ball at a different respective time that the flash was strobed and/or the shutter was opened.

The camera(s) 12 can be positioned in a number of different locations relative to the tee box or other location from which the golfer will strike the golf ball. For example, the camera can be positioned to one side of the tee box in a direction orthogonal to the downrange direction 18 so as to be focused upon the golf ball sitting upon the tee as well as the region immediately downrange of the tee. The camera can be positioned so as to be in front of the golfer, i.e., to face the golfer, once the golfer has addressed the golf ball as shown in FIG. 1. Alternatively, the camera may be positioned so as to be located either between the legs of the golfer once the golfer takes his or her stance or somewhat in rear of the golfer with the optical axis of the camera extending between the legs of the golfer. In this case, the backdrop 16 could be positioned facing the golfer on the opposite side of the golf ball. In either instance, in order to obtain the clearest images of the golf ball, the background is preferably of a color that differs from the golf ball.

Alternatively, the camera 12 may be located in advance or forward of the tee box or other location from which the golf ball will be struck, as shown in FIG. 2. In this regard, the camera may be disposed so as to be upwardly facing, i.e., facing the sky. The camera would still preferably be relatively close to the tee, such as by being displaced from the tee by about 1 to 2 feet. In addition, the camera would typically be disposed along the anticipated path of travel of the golf ball. However, the camera could be displaced somewhat from the anticipated path of travel of the golf ball so long as the resulting image captured by the camera included the anticipated path of travel of the golf ball. Among other things, an upwardly facing camera disposed in advance of the tee box or other location from which the golf ball is struck provides images which allows the processing circuitry (described below) to have increased sensitivity with respect to the sidespin of the golf ball since the logo or other markings on the golf ball from which the sidespin of the golf ball will be determined are now moving about the circumference of the golf ball as opposed to through the interior of the image of the golf ball captured by a camera located to one side of the tee box. As a result of the movement of the logo or other markings about the circumference of the golf ball, the logo or other markings will move a greater distance within the same period of time and, accordingly, sidespin can be measured with increased precision.

The processing circuitry 14 receives the image(s) captured by the camera(s) 12 and thereafter measures the various parameters that define the golf shot. The processing circuitry can be embodied in many different manners, but is typically embodied by a microprocessor, a computer or the like. For example, the processing circuitry of one embodiment includes an Intel® microprocessor with a clock rate of greater than 500 MHz and operating under control of a Microsoft® Windows XP operating system and having an associated 64 MB memory device. As described above, in addition to processing the images captured by the camera, the processing circuitry controls or actuates the camera by synchronizing the shutter and/or the lighting in response to a signal from the triggering mechanism.

The processing circuitry 14 may be coincident with the camera(s) 12. Alternatively, the processing circuitry may be remote from the camera, but in communication therewith. While the image processing provided by the processing circuitry is preferably performed immediately following the capture of the images, the image processing performed by the processing circuitry may be performed at any later time, if so desired.

Upon receiving the image(s), the processing circuitry 14 initially locates each image of the golf ball. For each image of the golf ball, the processing circuitry then generally determines the edge of the golf ball and, in turn, the center of the golf ball. In order to identify each image of the golf ball, the processing circuitry analyzes the pixels that form the overall image to identify a group of pixels having a consistent color that are indicative of a golf ball. In particular, the processing circuitry reviews the pixels of the image to identify a generally circular group of pixels that consistently have a relatively white color. In this regard, the size of the generally circular group of pixels and the range of colors that will be considered to represent a generally white golf ball may be determined during the process if analyzing the images captured by the camera 12 as described above. In instances in which the camera captures a number of different images of the golf ball, each image can be analyzed to identify a single golf ball. Alternatively, in those embodiments in which the camera captures a single image which includes multiple images of the golf ball at somewhat different times and in somewhat different positions as shown in FIG. 3, the processing circuitry will review the overall image in order to identify the predetermined number of images of the golf ball therewithin.

As indicated above, the processing circuitry 14 may identify the edge of the golf ball in other manners once each image 20 of the golf ball has been identified. While this process of identifying each golf ball within the image and defining the edge of each golf ball within the image may be performed in various manners, one advantageous method, typically implemented by processing circuitry operating in accordance with computer program instructions, is described below. In this advantageous method illustrated in FIG. 4, the image, consisting of pixels having respective pixel values, typically ranging from completely black pixels having a value of zero to completely white pixels having a value of 255, is initially analyzed to determine the pixel value threshold that will distinguish pixel values that are considered to be representative of the golf ball from pixel values that are considered to be representative of the background. In this regard, an approximation of the number of pixels within the image that are representative of the golf ball(s) is determined. See block 30. For a respective image of the golf ball, the number of pixels that are representative of the golf ball will vary based upon the distance between the camera and the golf ball with the image having fewer pixels representative of the golf ball in instances in which the camera is spaced further from the golf ball and, conversely, the image having more pixels representative of the golf ball in instances in which the camera is positioned closer to the golf ball. For purposes of example, the method, apparatus and computer program product may be designed such that that ball has a diameter of 100 pixels in instances in which the camera is spaced from the golf ball by a recommended distance. To accommodate different spacings between the camera and the golf ball and, in turn, to make the apparatus simpler to install, the number of pixels that comprise the diameter of the golf ball may be defined to be within a range, such as a range having a lower bound of 60 pixels, representing instances in which the camera is positioned further from the golf ball, and an upper bound of 150 pixels, representing instances in which the camera is closer to the golf ball.

The number of pixels that are representative of the golf ball may therefore be initially defined as $2\pi r^2$ in which r is the radius of the golf ball in pixels. To ensure that the pixel value threshold is suitable for images captured at various spacings of the camera from the golf ball, the radius of the golf ball in pixels is generally defined to be the lower bound of the range, i.e., 60 pixels/2. Since two images of the golf ball are generally captured within the same overall image, the initial definition of the number of pixels representative of the golf ball are typically doubled, i.e., $2\times 2\pi r^2$. Moreover, to ensure that the image of the golf ball that is initially identified is slightly smaller than the actual image of the golf ball, the number of pixels representative of the golf ball may be increased slightly, such as by multiplying the number of pixels by 4/3. Thus, in one embodiment, the number of pixels considered to be representative of the golf ball is $4\pi 60^2/3$. As used hereinafter, the number of pixels that are considered to represent the golf ball is designated N.

According to this technique for detecting the pixel value threshold, a distribution of the pixel values of the pixels that make up the image is constructed. See block 32. As shown in FIG. 5, this distribution extends from a lowest pixel value L, such as zero, to a highest pixel value H, such as 255. As will be noted, a majority of the pixels have values near the lowest pixel value and are therefore representative of the relatively dark background. Since the golf ball is generally much lighter or whiter than the dark background, the N-most pixel values that closest to the highest pixel value, i.e., the N-most pixel values that are the largest, are most likely representative of the golf ball. Thus, a pixel value threshold is at least initially defined as indicated by vertical line 40 in FIG. 5 between the N-most pixel values that are closest to the highest pixel value and the remainder of the pixels values. See block 34 of FIG. 4. Those pixels having pixel values that equal or exceed the pixel value threshold are therefore initially identified as being representative of the golf ball, with the remainder of the darker pixels are initially indicated to be representative of the background.

While this technique provides a relatively accurate estimate of the pixel value threshold and the pixels that are representative of the golf ball, this estimate may be refined, if desired. In this regard, a range of pixel values slightly less than the pixel value threshold may be examined. With respect to FIG. 5, for example, the range of pixel values is designated 42. The curve defined by the distribution of pixel values may be evaluated throughout this range of pixel values to identify that portion, if any, of the curve closest to the pixel value threshold 40 that has a first derivative, i.e., a slope, that exceeds a predefined value. In terms of the representation of the distribution of pixel values set forth in FIG. 5, this refinement is attempting to identify a portion of the distribution at pixel values slightly less than the pixel value threshold that experiences a fairly sharp increase. In instances, such as depicted in FIG. 5, in which a portion of the curve defined by the distribution of pixel values within this range of pixel values does have a first derivative that exceeds the predefined value, the pixel value threshold is reset, i.e., lowered, to the pixel value designated by the vertical line 44 in FIG. 5 at which the curve defined by the distribution of pixel values first exhibits a first derivative that exceeds the predefined value. See block 36 of FIG. 4. Alternatively, if that portion of the curve defined by the distribution of pixel values within this range of pixel values does not have a first derivative that exceeds the predefined value, the pixel value threshold remains at the same value as initially determined. See block 38.

Once the pixel value threshold has been defined, the image is analyzed to determine candidate blobs that may be representative of the golf ball. In this regard, a plurality of circular regions of the image are analyzed to determine if the pixels within each circular region likely represent the golf ball. While various techniques may be utilized to determine if the pixels within a circular region of the image are likely to represent the golf ball, the pixels within a circular region of the image may be identified as being likely to represent the golf ball if the percentage of pixels within the circular region that exceed the pixel value threshold is at least as great as a predefined percentage, such as about 50%. In addition to merely examining the pixel values, other factors may be considered, if desired, to refine the identification of candidate blobs. For example, the morphology of the pixels that have a pixel value greater than the pixel value threshold may also be examined, such as to determine the roundness of this group of pixels with rounder groupings of pixels being more likely to represent the golf ball.

Typically, a number of circular regions of the image are separately evaluated as shown in FIG. 6. The spacing or step size between adjacent circular regions, both horizontally and vertically, may be defined as desired based upon a tradeoff of resolution and processing time with smaller step sizes providing potentially increased resolution but requiring increased processing time. Additionally, this analysis of the image is generally repeated for circular regions having a number of different sizes within the predefined range of potential ball sizes attributable to different spacing between the camera and the golf ball. For example, the analysis of the image may be repeated for circles having diameters between 60 and 150 pixels based upon the foregoing example of possible golf ball sizes.

Based upon the evaluation of each of the circular regions, a number of candidate blobs are identified that may represent the golf ball. The candidate blobs may be determined in various manners, such as by identifying those circular regions in which at least a predefined percentage of the pixels within the circular region have pixel values that exceed the pixel value threshold to be candidate blobs.

Based upon these candidate blobs, the blob(s) that are most likely to represent the golf ball are then identified. In instances in which the image includes first and second images of the golf ball at different times during the flight of the golf ball, the two most likely blobs that are at least partially spaced apart are identified. While the most likely blobs may be identified in various manners, one technique initially sorts the candidate blobs based upon the percentage of pixels within the respective blobs that have pixel values that exceed the pixel value threshold. As such, the blob having the greatest percentage of pixels that exceed the pixel value threshold is considered the most likely blob to represent the golf ball. Since it is common to generate a number of candidate blobs that are actually representative of the same image of the golf ball and that overlap substantially with one another, it is generally desirable to eliminate other candidate blobs that substantially overlap the blob that has been determined to be the most likely candidate. Thus, all candidate blobs that overlap the most likely candidate blob by more than a predefined percentage, such as by more than 10%, may be eliminated. Following the elimination of these overlapping blobs, the second most likely blob is then identified and is considered to be representative of the second image of the golf ball. As such, two blobs have now been identified that are representative of the first and second images of the golf ball.

Since the blobs are likely not centered relative to the respective images of the golf ball, the blobs are generally further processed to center the blobs with respect to the respective images of the golf ball. The blobs may be centered with respect to the corresponding images of the golf ball in various manners. In order to center the blob with respect to the respective image of the golf ball in accordance with one embodiment, however, the pixels that comprise the blob (the outline of which is designated 50 in FIG. 7) are analyzed along a plurality of different radial directions 52. Along each radial direction, a rolling average of the pixel values is determined from the center of the blob outward. This average pixel value is then compared to the pixel value threshold and, once this average pixel value falls below the pixel value threshold, the edge location of the golf ball in the respective radial direction is identified as being the radially outwardmost pixel that may be included within the average pixel value without the average pixel value falling below the pixel value threshold.

By way of example, the pixel value of the centermost pixel is initially compared to the pixel value threshold. Assuming the pixel value of the centermost pixel exceeds the pixel value threshold, the average pixel value of the two pixels along the radial direction closest to the center of the blob, i.e., the centermost pixel and the adjacent pixel along the radial direction, is compared to the pixel value threshold. This process continues with the average pixel value taken of increasingly larger groups of pixels until the average pixel value of the pixels extending outwardly in the radial direction from the center of the blob falls below the pixel value threshold.

While the actual pixel values may be utilized, the pixels having a pixel valve that exceeds the pixel value threshold, i.e., pixels representative of the golf ball, may be given a relatively high weighted pixel value, such as a weighted pixel value of 10, while the pixels having a pixel value that is less than the pixel value threshold, i.e., pixels represen- tative of the darker background, may be given a relatively low weighted pixel value, such as a weighted pixel value of 0. The weighted pixel values are then preferably utilized in the foregoing technique to identify an edge location. By differently weighting the pixels, significant contrast is provided between pixels having pixel values that are greater than and less than the pixel value threshold By utilizing an average pixel value, the radial direction can extend across a mark, such as a dark line, on a ball without falsely identifying the mark as the edge of the ball. In this regard, the mark is generally not sufficiently wide to decrease the average of the pixel values sufficiently to cause the average to fall below the pixel value threshold. This process of determining the edge location is repeated along a number of different radial directions as indicated by FIG. 7. Although not shown in FIG. 7 which only illustrates a few of the radial directions, this process may be repeated in 180 different radial directions that are spaced evenly apart every two degrees about the blob.

Following the analysis of the pixel values along each radial direction, the collection of edge locations determined along each radial direction is analyzed. In this regard, a plurality of candidate circles are constructed with each circle including a unique combination of three edge locations. Typically, candidate circles are constructed for every different combination of three edge locations. The candidate circles are then evaluated to determine the circle that most likely represents the edge of the golf ball within the image. Although the evaluation of the candidate circles may be conducted according to various techniques, the average location of the centers of the candidate circles and the average radius of the candidate circles may be separately determined and, at least initially, defined to be the center and the radius of the circle that most likely represents the edge of the golf ball within the image.

In order to refine this estimate, those candidate circles that are outliers may be discarded. An outlying candidate circle may be defined in various manners, but, in one embodiment, is defined as a candidate circle having either a center that deviates in position from the average location of the centers of the candidate circles by more than one standard deviation or a radius that deviates in position from the average radius of the candidate circles by more than one standard deviation. These outliers may be discarded and the centers and the radii of the remaining candidate circles may again be averaged. While the resulting average can again be further refined, this refined average of the center location and the radius is generally sufficiently accurate such that the circular group of pixels that is centered about a location defined by this refined average is now also centered with respect to the corresponding image of the golf ball.

While the centered group of pixels could be utilized during subsequent analysis of the flight of the golf ball, the edge of the image of the golf ball is preferably further refined. In this regard, the circular edge that now defines the boundary of the centered group of pixels as described above represents a good approximation of the edge of the golf ball. As such, further analysis of the edge of the golf ball may be concentrated on a relatively small ring of pixels in the vicinity of this approximate edge. While the edge of the image of the golf ball may be refined in various manners, one advantageous technique again analyzes the pixels in a number of different radial directions. Along each radial direction, the pixel values are evaluated from a point slightly within the approximate edge of the golf ball, such as ten or fifteen percent within the approximate edge of the golf ball, to a point slightly outside of the approximate edge of the golf ball, such as about ten or fifteen percent outside of the approximate edge of the golf ball. As shown in FIG. 8, the range of pixels that are evaluated in the radial direction are depicted by the radially extending lines 60 that intersect the approximate edge 62 of the golf ball.

Along each radial direction, the pixel values of adjacent pixels are evaluated to determine if the difference between the pixel values exceeds a predetermined value. Typically, the pixels are not analyzed on an individual basis, but adjacent groups of pixels, such as adjacent groups of five pixels, are analyzed to determine if the average pixel value of the pixels in each group varies by more than a predefined value. If not, the next two groups of pixels are evaluated, and so on until the difference between the average pixel values exceeds the predetermined value. In the rare instance in which the evaluation of the pixels in a radial direction is completed without identifying any groups of adjacent pixels that have pixel values that differ by more than the predetermined value, that particular radial location is skipped and the next radial location is evaluated. The step size in terms of pixels between the groups may be set as desired, but may be as small as one pixel and, in one embodiment, is set between 5 pixels and 20 pixels. By way of example, the pixels may be analyzed along the radial direction from an innermost pixel located 10% within the approximate edge of the golf ball to an outermost pixel located 10% outside the bound of the golf ball. Starting at the innermost pixel and designating this pixel as pixel 0, the average pixel value of the group of pixels designated 0–4, i.e., the innermost five pixels, is initially compared to the average pixel value of the pixels designated 5–9, i.e., the next five pixels in the radial direction. If the difference between the average pixel values does not exceed the predefined value, the average pixel value for the group of pixels designated 1–5 is then compared to the average pixel value for the group of pixels designated 6–10. This process continues until the difference between the average pixel values exceeds the predetermined value; at which point the edge location is defined to be between the two groups of pixels. As before, this process occurs along a plurality of radial directions, some of which are shown in FIG. 8, such as 180 different radial directions spaced every two degrees about the circular blob.

Once the edge locations along each radial direction have been identified, a plurality of candidate circles are generated based upon each unique combination of three edge locations as described above. These candidate circles are then evaluated to determine the most likely candidate circle, such as by determining the average candidate circle in terms of the center location and radius as described above. As also described above, the average candidate circle may be further refined by discarding the outlying candidate circles and determining the average candidate circle from among the remaining candidate circles. Upon completion, the average of the candidate circles sharply defines the edge of the image of the golf ball and is appropriately centered relative to the actual image of the golf ball. This process of defining the circular region of the overall image that best represents the image of the golf ball is repeated for each image of the golf ball within the overall image. Since the image of each golf ball is identified and precisely defined as described above, the stage is set for further analysis of parameters associated with the flight of the golf ball based upon the two images of the golf ball that are spaced apart from one another as a result of the difference in time at which the images of the golf balls were captured. For example, the image of the golf ball may be initially divided into a number of segments 22 as shown in FIG. 4. Although not necessary for the practice of the present invention, each segment generally has an arcuate shape of the same size. Additionally, while the image of the golf ball may be divided into segments such that every portion of the image of the golf ball is included within a respective segment, the segments may alternatively be spaced from one another such that some portions of the image of the golf ball may not be included in any segment. In addition, although the segments may be divided into segments that overlap to some degree, the image of the golf ball is generally divided into segments that do not overlap. For example, the processing circuitry of one embodiment constructs six segments with each segment defining an equal interior angle in the range of 5° to 7° spaced evenly about the circumference of the golf ball.

Within each segment 22, that portion of the segment that appears to include the edge of the golf ball is analyzed in greater detail. In order to identify that portion of the segment which includes the edge of the golf ball, the pixels are generally analyzed in a radial direction to identify that portion of the segment which exhibits a relatively marked change in color since the pixels representative of the golf ball will generally have a fairly consistent color, such as white, and will contrast significantly with the background. See, for example, FIG. 10 which presents a graphical representation of this marked change. Once the edge of the golf ball has generally been located within a respective segment, the group of pixels that is believed to include the edge of the ball as a result of the marked change in color of the pixels in a radial direction is defined. For example, this region 24 may include the predetermined number of pixels in a radial direction, such 5 to 15 pixels for example, that extend on both sides of the line along which the color of the pixels markedly changes.

Within the region that has been defined within each segment 22 of the image 20 of the golf ball, the processing circuitry 14 can further review the pixels in order to refine the location of the line that defines the edge of the golf ball. In one embodiment, the processing circuitry reviews the pixels by systematically positioning an imaginary line representative of the edge of the golf ball at each of a number of different locations within the region, such as at every possible different location within the region. In FIG. 11, for example, two different imaginary lines 26 are depicted that dissect the pixels in the region of interest. For each different imaginary line representative of the edge of the golf ball, the pixels that would fall within the interior of the golf ball are compared to the pixels that would fall on the exterior of the golf ball. For example, the average and the standard deviation of the color of the pixels that would fall within the interior of the golf ball may be determined and compared to the average and standard deviation of the color of the pixels which would be exterior to the golf ball. While this comparison can be made in a variety of different manners, the processing circuitry of one advantageous embodiment normalizes the average and standard deviations of the color of the pixel so that the average and standard deviation, following normalization, each have approximately the same general magnitude. Thereafter, the normalized average and standard deviation of the pixels that would fall within the interior of the golf ball are summed, the normalized average and standard deviation of the pixels that would be exterior to the golf ball are summed, and the difference between these sums is determined. By comparing this difference for each respective imaginary line that potentially defines the edge of the golf ball, the processing circuitry can identify the best approximation of the edge of the golf ball. Typically, the processing circuitry determines the best approximation of the edge of the golf ball to be the imaginary line associated with the largest difference between the sums of the normalized averages and standard deviations of those pixels that would lie within the interior of the golf ball and the pixels on the exterior of the golf ball. In the example of FIG. 11, the upper imaginary line would define the best approximation of the edge of the golf ball since those pixels above the line are darker than those pixels below the line.

In the typical embodiment in which the segments 22 are not continuous but are instead spaced about the circumference of the golf ball, the processing circuitry 14 may define the edge of the entire golf ball by interpolating between the best approximation of the edge of the golf ball within at least three segments of the image. In this respect, the processing circuitry may utilize the best approximation of the edge of the golf ball from each segment of the golf ball in this interpolation process in order to construct the edge of the entire golf ball. Alternatively, the processing circuitry may construct the edge of the entire golf ball by interpolating between the best approximation of the edge of the golf ball from a subset of the segments, such as the three segments which have the best approximation of the edge of the golf ball as generally defined as the three segments having the largest difference between the sums of the normalized averages and standard deviations of those pixels that would lie within the interior of the golf ball and the pixels on the exterior of the golf ball.

Once the edge and the center of the golf ball have been defined, the processing circuitry 14 can determine various parameters associated with the golf shot including, for example, the launch angle. In instances in which two or more images of the golf ball are captured within a single overall image, the processing circuitry can readily determine the launch angle as indicated in FIG. 3. Similarly, the processing circuitry can determine the launch angle in instances in which the same camera 12 obtains two separate images of the golf ball. However, in instances in which two cameras capture separate images of the golf ball at different instances in time, the overall images captured by the cameras are initially oriented with respect to one another, prior to determining the launch angle. For example, this process may consist of capturing an image of the same target or alignment image, such as a black circle in the middle of a white field, with both cameras. The amount of offset between the images captured by the two cameras can then be determined. By shifting the images of the golf ball that are subsequently captured by the cameras by this same offset, the images may be aligned. Typically, this alignment process need only be performed during the initial installation of the launch monitor 10 and following any movement of the launch monitor.

In addition to or instead of identifying the launch angle, the processing circuitry 14 generally determines a number of other parameters including the backspin, sidespin and/or rifle spin of the golf ball. As described above, the backspin is a measure of the rotation of the ball, typically in revolutions per minute, about a horizontal axis extending through the center of the golf ball and transverse to the downrange direction in which the golf ball is driven. Similarly, the sidespin is the rotation of the golf ball, also generally in revolutions per minute, about a vertical axis through the center of the golf ball. Further, rifle spin is rotation of the golf ball, also typically in revolutions per minute, about a horizontal axis extending in the down range direction in which the golf ball is driven. Since the backspin, sidespin and rifle spin are respective rotational rates, the processing circuitry therefore not only determines the respective angular rotation attributable to backspin and sidespin that occurs between two temporally displaced images of the golf ball, but is also provided with the lapse of time between the two images such that the rotation of the ball about a respective axis divided by the time lapse between the images of the golf ball will provide the respective spin rate.

Although the backspin and sidespin can be determined in various manners, the processing circuitry 14 of one advantageous embodiment initially evaluates each image of the golf ball and separates those pixels of each image that are representative of the mark, such as a stripe, on the golf ball from those pixels that are representative of the unmarked, generally white dimpled surface of the golf ball. See block 70 of FIG. 12. While the pixels representative of the mark may be distinguished from the pixels that are representative of the otherwise unmarked, white surface of the ball in various manners, one technique evaluates each pixel to determine if the respective pixel is significantly darker, i.e., has a significantly lower value, than the surrounding pixels. If so, the pixel is considered to be representative of a mark. Otherwise the pixel is considered to be representative of the unmarked white surface of the golf ball.

The degree by which the pixel must be darker than the surrounding pixels as expressed by a difference in pixel values between the pixel value of the pixel under evaluation and the average pixel value of the surrounding pixels may be selected as desired, such as to a predefined minimum acceptable contrast. In addition, the number of surrounding pixels that are considered during this evaluation may be selected based upon the expected size of the mark on the ball with larger numbers of surrounding pixels being considered in instances in which the mark is larger and smaller numbers of surrounding pixels being considered in instances in which the mark is smaller. In any event, the number of surrounding pixels should be selected such that pixels representative of the mark will be compared to a number of surrounding pixels that include a number or pixels representative of the unmarked white surface of the golf ball, thereby insuring the difference in pixel values that is required to identify a pixel as being representative of a mark.

Once the pixels representative of a mark on the golf ball have been determined, at least some of the pixels are representative of the mark on the golf ball are mapped to corresponding locations within a three dimensional coordinate system. See block 72 of FIG. 12. While all of the pixels that are representative of the mark on the golf ball may be mapped to corresponding locations within the three dimensional coordinate system, typically only a subset of the pixels that are representative of the mark on the golf ball are mapped with the pixels that are mapped to corresponding locations within the three dimensional coordinate system being spaced apart from one another in order to reduce the processing time and resources that are required. While the pixels that are representative of the mark on the golf ball may be mapped in various manners, one aspect of the present invention maps at least some of the pixels that are representative of the mark on the golf ball by determining latitude and longitude values for these pixels. The latitude and longitude values may be defined as follows:

$$\text{Latitude} = \arccos(y/(\text{diameter}/2))$$

$$\text{Longitude} = \arcsin(x/(\text{diameter}/2))$$

wherein diameter is the diameter of the image of the golf ball in pixels, y is the relative distance of the pixel under evaluation from the center pixel in the vertical direction (as measured in pixels), and x is the relative distance of the pixel under evaluation from the center pixel in the horizontal direction (as measured in pixels).

Once at least some of the pixels that are representative of the mark on the golf ball have been mapped to corresponding locations in the three dimensional coordinate system, a plurality of candidate planes are generated for each image of the golf ball. See block 74 of FIG. 12. Each candidate plane extends through the respective locations of at least two pixels that have been mapped to the three dimensional coordinate system and, more commonly, extends through the center of the golf ball and at least two pixels that have been mapped to the three dimensional coordinate system. Typically, candidate planes are generated for every unique combination of two pixels that have been mapped to the three dimensional coordinate system.

A respective reference plane is then determined for each image of the golf ball based upon the plurality of candidate planes for the respective image of the golf ball. See block 76. While the reference plane may be determined from the plurality of candidate planes in various manners, one advantageous technique is described below. In this regard, each of the candidate planes is generally defined as a vector extending normal to the candidate plane and coincident with the center of the image of the golf ball. Although this vector may have various magnitudes, the vector may be advantageously defined to be a unit vector for convenience during subsequent processing. Since the candidate planes exist in the three dimensional coordinate system, the vector that represents each candidate plane has i, j and k components and may be expressed generically as Xi+Yj+Zk.

Each component of the vectors representative of the plurality of candidate planes is separately analyzed. With respect to the i component of the vectors representative of the plurality of candidate planes, a histogram is constructed over the entire range of potential magnitudes for the i component. While the subdivisions of the entire range may be defined in various manners, a histogram may be constructed with a hundred different subdivisions split evenly between the smallest possible value, zero, and the largest possible value, one for the case of a unit vector. In this example, the smallest subdivision is for i values between 0 and 0.01, the second smallest subdivision is for i values between 0.01 and 0.02 and so on, until the $100^{th}$ subdivision for i values between 0.99 and 1.00. The i component of the vector representative of each candidate plane is then placed in or otherwise associated with the appropriate subdivision based upon the magnitude of thei component.

Based upon the resulting histogram, the subdivision having the most members is identified. While an i value within this most populous subdivision could be utilized for the i value of the vector representing the reference plane, the i value of the vector representing the reference plane is generally further refined. In this regard, i values that are outliers are generally discarded from the histogram, such as by discarding all subdivisions that are located more than one standard deviation away from the subdivision having the most members. The members of the remaining subdivisions are then averaged based upon the magnitude of the members of the remaining subdivisions. This resulting average is utilized as the magnitude of the i component for the vector representing the reference plane. This process is separately repeated for the j and k components of the vectors representing the plurality of candidate planes to define the resulting vector representing the reference plane. This reference plane therefore represents a best fit plane that extends through the center of the ball and through the mark on the surface of the ball.

Although not necessary for the practice of the invention, the vector representative of the reference plane may be rotated about two axes to correct for distortion introduced by the lens of the camera, thereby eliminating the undesirable fisheye effect in instances in which the image of the golf ball is offset from the center of the overall image. See block 78 of FIG. 12. In this regard, the vector representative of the reference plane is rotated about the x axis in instances in which the image of the golf ball is offset vertically from the center of the overall image, while the vector representative of the reference plane is rotated about the y axis in instances in which the image of the golf ball is offset horizontally, such as to the left or right, from the center of the overall image. The degree to which the vector representative of the reference plane is rotated along either the x or y axis depends upon the distance between the center of the image of the golf ball and the center of the overall image with larger displacements requiring more rotation. The amount of rotation can be defined in various manners as known to those skilled in the art. For example, the amount of rotation may be defined by a function, such as a parabolic function, that defines a curve corresponding or equivalent to the curvature of the lens of the camera that introduces the fisheye effect.

This process of identifying a reference plane as represented by a corresponding vector is conducted for each of the two images of the golf ball that are captured at different times during flight of the golf ball. Based upon the vectors representative of the reference planes for the respective images of the golf ball, at least one component of the spin of the golf ball may advantageously be determined. In this regard, the cross product of the vectors representative of the reference planes for the first and second images of the golf ball defines the spin vector, while the arc cosine of the dot product of the vectors representative of the reference planes for the first and second images of the golf ball is a scaler representing the angle between the vectors, i.e., the total spin of the golf ball. By multiplying the i, j and k components of the spin vector by the angle between the vectors, the rifle spin, sidespin and backspin are generated, respectively. See block 80 of FIG. 12. Additionally, by dividing the angle between the vectors that was determined by the arc cosine of the dot product of the vectors representative of the reference planes of the first and second images of the golf ball by the elapsed time between the respective times at which the first and second images of the golf ball are captured. the total revolutions per minute (RPM) of the spin on the golf ball is determined. See block 82. As such, valuable parameters, such as the backspin, sidespin, rifle spin and RPM of the golf ball may be accurately and efficiently determined according to one aspect of the present invention.

The processing circuitry 14 can also determine components of the spin of the golf ball in other manners, such as by initially flattening each image of the golf ball as known to those skilled in the art. Thereafter, the processing circuitry of this embodiment overlays one image of the golf ball upon the other image of the golf ball such that the edges of the images of the golf balls that have been constructed as described above are substantially aligned, i.e., until the best alignment is achieved. At least one of the images of the golf ball, such as the image of the golf ball captured at a later time, is then: (1) rotated about an axis extending perpendicular to the flattened image and through the center of the golf ball depicted in the flattened image, and (2) shifted in the plane of the flattened images, until the best match between the flattened images of the golf ball is obtained. While the best match may be defined in various manners, the best match may be defined to be that arrangement of the images of the golf ball in which the correlation of the brightness of the respective pixels, i.e., the pixels in the two images of the golf ball that are aligned following rotation and shifting of at least one of the images, is maximized. During this process of rotating and shifting the flattened images of the golf ball to obtain the best match, the processing circuitry determines the degree of angular rotation and the linear distance in the plane by which the images are shifted to achieve the best match.

The processing circuitry 14 of this embodiment then determines the backspin of the golf ball since the backspin of the golf ball has been found to be proportional to the angular amount by which the flattened images of the golf ball must be rotated to achieve the best match. In particular, the backspin in revolutions per minute is generally equal to $((\theta/360°)/t)*60$, wherein $\theta$ is the angular amount measured in degrees by which the flattened images of the golf ball must be rotated to achieve the best match, t is the time lapse between the images as measured in seconds. Likewise, the processing circuitry determines the sidespin of the golf ball since the sidespin is proportional to the linear distance by which the images of the golf ball must be shifted in the plane to achieve the best match. Generally, the linear distance by which the images of the golf ball must be shifted in the plane to achieve the best match, i.e., the displacement, is converted to an angular displacement a as follows: $\alpha$=arc tan (displacement/radius of the golf ball). Thereafter, the angular displacement $\alpha$ is utilized to determine the sidespin which is generally equal to $((\alpha/360°)/t)*60$.

While the launch monitor 10 including the processing circuitry 14 is therefore capable of determining the backspin and sidespin of a golf ball marked with a single mark, such as a single circumferential stripe, the launch monitor and, in particular, the processing circuitry may also be capable of determining the backspin and the sidespin of an unmarked ball, that is, a golf ball that includes at least one logo but is otherwise unmarked as shown in FIG. 3. In this regard, an unmarked ball will generally include a pair of logos imprinted on opposite sides of the golf ball. As used herein, logo refers to the conventional markings upon a golf ball which generally consist of the manufacturer's name, the model name and/or number of the golf ball or perhaps the insignia of a sponsoring organization or the like. The logo does not, however, reference a circumferential stripe or the reflective or fluorescent spots generally imprinted upon golf balls that are specially designed for use in tracking applications. Accordingly, the launch monitor can advantageously determine a wide variety of parameters including the backspin and sidespin of any conventional golf ball and does not require that the golfer hit a specially marked golf ball as necessitated by conventional tracking systems.

In this regard, the launch monitor 10 and, in particular, the processing circuitry 14 of this embodiment would determine the backspin and the sidespin of an unmarked ball including at least one logo in the manner described above. In the images of the golf ball captured by the camera, at least one point within the logo is identified. Any point within the logo that is desired may be utilized, although a reference point that is readily identifiable is generally utilized. In one example in which a golf ball is imprinted with a logo identifying the manufacturer, XYZCO, the midpoint of the X at which the two oppositely oriented bars cross may be utilized as the reference point. Preferably, the processing circuitry heuristically determines the reference point based upon the desire that the reference point be uniquely identifiable regardless of the orientation of the golf ball. As described above, once the images of the golf ball that have been obtained at different times have been aligned relative to one another, if necessary, and have been flattened and moved into an overlying relationship, one of the images of golf ball is rotated and shifted relative to the other image of the golf ball until the reference points in the images are coincident and the best match between the images is obtained. Thereafter, the backspin and the sidespin can be determined by the processing circuitry in the manner described above based upon the proportionality of the backspin and the sidespin to the angular rotation and the lateral shifting of the images, respectively, that is required to obtain the coincidence of the reference points and the best match of the images of the golf ball.

The processing circuitry 14 may also be determine other parameters based upon the first and second images of the golf ball. In this regard, the speed of the golf ball may be determined which, in turn, will effect the projected carry and roll of the golf ball. In order to determine the speed of the golf ball, the distance between the first and second images of the golf ball must be determined. By comparing the first and second images of the golf ball, the distance between the centers of the respective images of the golf ball may be readily determined in pixels. In order to convert this distance measurement in pixels to a physical quantity, however, the camera must be calibrated with respect to the golf ball since the pixels in an image captured by a camera that is positioned closer to the golf ball will represent a smaller physical quantity than the pixels in an image captured by a camera that is positioned further away from the golf ball.

In order to precisely calibrate the launch monitor, the method, apparatus and computer program product of one advantageous aspect of the present invention utilize the well-defined size of the golf ball as the calibration standard. In this regard, once the edge of the golf ball has been precisely defined as described above, the number of pixels that comprise the image of the golf ball and/or the number of pixels that comprise the diameter of the golf ball may be accurately determined. Since the size or the golf ball is well-established, the physical quantity represented by each pixel may be readily determined, thereby defining the scale of the image. In instances in which the total number of pixels that comprise the image of the golf ball is known, the area represented by each pixel may be defined as $2\pi r^2/$(total number of pixels) wherein r is the actual radius of the golf ball. Alternatively, in instances in which the number of pixels that comprise the diameter of the golf ball is known, the width represented by each pixel may be defined as $2r/$(number of pixels). Thus, the distance between the first and second images of the golf ball may be readily converted from a measurement in pixels to a physical quantity or distance based upon this calibration of a pixel to the physical size of that portion of the image represented by the pixel. As such, the relationship between a pixel and the physical size of that portion of the image represented by the pixel is termed the calibration factor and defines the scale of the image.

In instances in which the golf ball does not travel in a plane parallel to the image sensor of the camera but, instead, travels slightly toward or slightly away from the camera, the method, apparatus and computer program product preferably correct the calibration factor based upon the flight path of the golf ball. For example, the method, apparatus and computer program product may determine the calibration factor for each image of the golf ball and then average the two calibration factors to provide a single calibration factor that is utilized during subsequent processing. However, the method, apparatus and computer program product can correct for variations in calibration factors due to the flight path of the ball in other manners if so desired.

By providing calibration based upon the known size of the golf ball, the method, apparatus and computer program product of this aspect of the present invention provide individual calibration for each golf shot, thereby insuring accurate results. Moreover, the calibration process is performed automatically and quickly so as to not delay the setup or operation of the launch monitor. Still further, the calibration technique of this aspect of the present invention permits some variation in the position of the camera relative to the golf ball so as to facilitate relatively simple setup of the camera with respect to the golf ball without the painstaking and time-consuming alignment processes required by at least some conventional systems.

A launch monitor 10 and associated methods are therefore provided according to the present invention for capturing and thereafter analyzing the images of a golf ball in a manner that permits various parameters associated with the golf shot including the backspin, sidespin and/or rifle spin of the golf ball to be determined in a reliable and economical manner. Further, the launch monitor and associated methods of the present invention can determine various parameters associated with the golf shot, including one or more components of spin to be determined with a single camera capable of capturing two images of the golf ball at different instances in time and utilizing a golf ball having only a single mark, such as a single circumferential stripe, or, in some embodiments utilizing an unmarked golf ball.

As described above, the various methods of the present invention are generally implemented by a computer program product that may direct the operation of the processing circuitry 14, for example. This computer program product includes a computer-readable storage medium, such as the non-volatile storage medium, and computer-readable program code portions, such as a series of computer instructions, embodied in the computer-readable storage medium.

In this regard, FIGS. 4 and 12 are flowcharts of some of the methods implemented by the computer program products of the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of determining at least one component of spin of a golf ball having a mark thereon, the method comprising:
receiving first and second images of the golf ball captured at different times during flight of the golf ball;
mapping, for each image of the golf ball, at least some pixels that are representative of the mark on the golf ball to corresponding locations within a three dimensional coordinate system;
generating a plurality of candidate planes for each image of the golf ball, each candidate plane extending through the respective locations of at least two pixels that have been mapped to the three dimensional coordinate system;
determining a respective reference plane for each image of the golf ball based upon the plurality of candidate planes for the respective image of the golf ball; and
determining at least one component of spin of the golf ball based upon the respective reference planes for the first and second images of the golf ball.

2. A method according to claim 1 wherein determining the respective reference plane for each image of the golf ball comprises representing the respective reference plane for each image of the golf ball with a vector extending through a center of the golf ball.

3. A method according to claim 2 wherein determining at least one component of spin of the golf ball comprises determining at least one of backspin, sidespin and rifle spin based upon a cross product of the vectors representing the respective reference planes for the first and second images of the golf ball.

4. A method according to claim 2 further comprising determining total revolutions per minute of the golf ball based upon a dot product of the vectors representing the respective reference planes for the first and second images of the golf ball.

5. A method according to claim 1 wherein mapping at least some pixels that are representative of the mark on the golf ball to corresponding locations within the three dimensional coordinate system comprises determining latitude and longitude values for at least some pixels that are representative of the mark on the golf ball.

6. A method according to claim 1 wherein mapping at least some pixels that are representative of the mark on the golf ball to corresponding locations within the three dimensional coordinate system comprises mapping pixels that are both representative of the mark on the golf ball and spaced apart from one another to corresponding locations within the three dimensional coordinate system.

7. A method according to claim 1 wherein generating the plurality of candidate planes comprises generating each candidate plane to extend through at least two pixels that have been mapped to the three dimensional coordinate system and a center of the golf ball.

8. A method according to claim 1 wherein determining the respective reference plane for each image of the golf ball comprising determining the reference plane for a respective image of the golf ball based upon an average of the plurality of candidate planes for the respective image of the golf ball.

9. A method according to claim 1 further comprising distinguishing pixels representative of the mark on the golf ball from pixels representative of unmarked portions of the golf ball.

10. A method according to claim 1 further comprising capturing the first and second images of the golf ball with a single camera.

11. A method according to claim 1 wherein the golf ball has only a single mark.

12. An apparatus for determining at least one component of spin of a golf ball having a mark thereon, the apparatus comprising:
processing circuitry for: (i) receiving first and second images of the golf ball captured at different times during flight of the golf ball; (ii) mapping, for each image of the golf ball, at least some pixels that are representative of the mark on the golf ball to corresponding locations within a three dimensional coordinate system; (iii) generating a plurality of candidate planes for each image of the golf ball, each candidate plane extending through the respective locations of at least two pixels that have been mapped to the three dimensional coordinate system; (iv) determining a respective reference plane for each image of the golf ball based upon the plurality of candidate planes for the respective image of the golf ball, and (v) determining at least one component of spin of the golf ball based upon the respective reference planes for the first and second images of the golf ball.

13. An apparatus according to claim 12 wherein said processing circuitry represents the respective reference plane for each image of the golf ball with a vector extending through a center of the golf ball.

14. An apparatus according to claim 13 wherein said processing circuitry determines at least one component of spin of the golf ball by determining at least one of backspin, sidespin and rifle spin based upon a cross product of the vectors representing the respective reference planes for the first and second images of the golf ball.

15. An apparatus according to claim 13 wherein said processing circuitry also determines total revolutions per minute of the golf ball based upon a dot product of the vectors representing the respective reference planes for the first and second images of the golf ball.

16. An apparatus according to claim 12 wherein said processing circuitry maps at least some pixels that are representative of the mark on the golf ball to corresponding locations within the three dimensional coordinate system by mapping pixels that are both representative of the mark on the golf ball and spaced apart from one another to corresponding locations within the three dimensional coordinate system.

17. An apparatus according to claim 12 wherein said processing circuitry also distinguishes pixels representative of the mark on the golf ball from pixels representative of unmarked portions of the golf ball.

18. An apparatus according to claim 12 further comprising a single camera for capturing the first and second images of the golf ball.

19. A computer program product for determining at least one component of spin of a golf ball having a mark thereon, the computer program product comprising a computer-readable storage medium having computer-readable program code portions stored therein, the computer-readable program portions comprising:
a first executable portion for receiving first and second images of the golf ball captured at different times during flight of the golf ball;
a second executable portion for mapping, for each image of the golf ball, at least some pixels that are representative of the mark on the golf ball to corresponding locations within a three dimensional coordinate system;
a third executable portion for generating a plurality of candidate planes for each image of the golf ball, each candidate plane extending through the respective locations of at least two pixels that have been mapped to the three dimensional coordinate system;
a fourth executable portion for determining a respective reference plane for each image of the golf ball based upon the plurality of candidate planes for the respective image of the golf ball; and
a fifth executable portion for determining at least one component of spin of the golf ball based upon the respective reference planes for the first and second images of the golf ball.

20. A computer program product according to claim 19 wherein said fourth executable portion is further capable of representing the respective reference plane for each image of the golf ball with a vector extending through a center of the golf ball.

21. A computer program product according to claim 20 wherein said fifth executable portion determines at least one component of spin of the golf ball by determining at least one of backspin, sidespin and rifle spin based upon a cross product of the vectors representing the respective reference planes for the first and second images of the golf ball.

22. A computer program product according to claim 20 further comprising a sixth executable portion for determining total revolutions per minute of the golf ball based upon a dot product of the vectors representing the respective reference planes for the first and second images of the golf ball.

23. A computer program product according to claim 19 wherein said second executable portion maps at least some pixels that are representative of the mark on the golf ball to corresponding locations within the three dimensional coordinate system by mapping pixels that are both representative of the mark on the golf ball and spaced apart from one another to corresponding locations within the three dimensional coordinate system.

24. A computer program product according to claim 19 wherein said third executable portion generates the plurality of candidate planes by generating each candidate plane to extend through at least two pixels that have been mapped to the three dimensional coordinate system and a center of the golf ball.

25. A computer program product according to claim 19 further comprising a sixth executable portion for distinguishing pixels representative of the mark on the golf ball from pixels representative of unmarked portions of the golf ball.

* * * * *